(12) United States Patent
Ji et al.

(10) Patent No.: US 9,594,553 B2
(45) Date of Patent: Mar. 14, 2017

(54) IDENTIFYING SEMANTIC DIFFERENCES BETWEEN SOURCE CODE VERSIONS

(71) Applicant: International Business Machines Corporation, Armonk, NY (US)

(72) Inventors: Jin Song Ji, Ponte Vedra, FL (US); Ke Wen Lin, Shanghai (CN); Qing Shan Zhang, Shanghai (CN); Yuheng Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/838,445

(22) Filed: Aug. 28, 2015

(65) Prior Publication Data

US 2016/0062765 A1    Mar. 3, 2016

(30) Foreign Application Priority Data

Sep. 2, 2014 (CN) .......................... 2014 1 0444102

(51) Int. Cl.
*G06F 9/44* (2006.01)
*G06F 11/36* (2006.01)

(52) U.S. Cl.
CPC .................. *G06F 8/71* (2013.01); *G06F 8/75* (2013.01); *G06F 11/3624* (2013.01)

(58) Field of Classification Search
CPC ...................................................... G06F 8/71

(Continued)

(56) References Cited

U.S. PATENT DOCUMENTS 7,296,261 B2 * 11/2007 Witchel .................... G06F 8/71
                                                              717/136
8,042,097 B2 * 10/2011 Aridor ...................... G06F 8/71
                                                              715/229

(Continued)

FOREIGN PATENT DOCUMENTS

CN              102110048 A      6/2011

OTHER PUBLICATIONS

Jaramillo et al, Sahara: Guiding the Debuging of Failed Software Upgrades (1999) retrieved from http://www.cs.virginia.edu/~soffa/Soffa_Pubs_all/Conferences/Comparison.Jaramillo.1999.pdf on Apr. 1, 2016.*

(Continued)

*Primary Examiner* — Lewis A Bullock, Jr.
*Assistant Examiner* — Theodore Hebert
(74) *Attorney, Agent, or Firm* — Joseph W. Cruz

(57) ABSTRACT

The present disclosure relates to a method and system for identifying a semantic difference between source code versions. In one embodiment of the present disclosure, there is provided a method for identifying a semantic difference between source code versions, comprising: obtaining first debugging information of a first source code version and second debugging information of a second source code version respectively; determining, by comparing the first debugging information with the second debugging information, whether in the second source code version there exists a second function matching a first function in the first source code version; and identifying the semantic difference on the basis of a result of the determining. In one embodiment of the present disclosure, there is provided a system for identifying a semantic difference between source code versions. By means of the present disclosure, a semantic difference (Continued)

between various source code versions can be identified rapidly and accurately.

16 Claims, 7 Drawing Sheets

(58) Field of Classification Search
USPC .......................................................... 717/122
See application file for complete search history.

(56) References Cited

U.S. PATENT DOCUMENTS

| | | | | |
|---|---|---|---|---|
| 8,132,157 | B2* | 3/2012 | Dhuvur | G06F 11/3688 |
| | | | | 714/38.1 |
| 8,196,135 | B2* | 6/2012 | LaFontaine | G06F 17/2247 |
| | | | | 717/122 |
| 8,495,572 | B2* | 7/2013 | Bernin | G06F 8/71 |
| | | | | 717/122 |
| 8,533,668 | B2* | 9/2013 | de Oliveira Costa | G06F 8/75 |
| | | | | 717/110 |
| 2004/0221270 | A1* | 11/2004 | Witchel | G06F 8/71 |
| | | | | 717/124 |
| 2005/0028143 | A1* | 2/2005 | Aridor | G06F 8/71 |
| | | | | 717/122 |
| 2007/0168975 | A1* | 7/2007 | Kessler | G06F 11/362 |
| | | | | 717/124 |
| 2009/0044178 | A1* | 2/2009 | Aridor | G06F 8/71 |
| | | | | 717/143 |
| 2010/0050159 | A1* | 2/2010 | Daniel | G06F 11/3624 |
| | | | | 717/125 |
| 2010/0299654 | A1* | 11/2010 | Vaswani | G06F 11/366 |
| | | | | 717/128 |
| 2011/0265063 | A1* | 10/2011 | de Oliveira Costa | G06F 8/75 |
| | | | | 717/120 |
| 2016/0062765 | A1* | 3/2016 | Ji | G06F 11/3624 |
| | | | | 717/122 |

OTHER PUBLICATIONS

Baseer et al., "Root Cause Detector: Tool for Detecting Root Cause of Regression Bugs," International Journal of Advanced Research in Computer Science and Software Engineering, Jan. 2014, pp. 1082-1091, vol. 4, Issue 1, © 2014, IJARCSSE, ISSN: 2277 128X.

Raghavender et al., "Semantic Differences and Graphical View of Files," Tekniska Hogskolan, Hogskolan I Jonkoping, 2009, 42 pages, Master Thesis 2009 Computer Engineering.

Tao Xie et al., "Checking Inside the Black Box: Regression Testing by Comparing Value Spectra," IEEE Transaction on Software Engineering, 2005, pp. 1-15, vol. 31, Issue 10, Copyright © 2005, IEEE, DOI: 10.1109/TSE2005.107.

Unknown, "DWARF", Wikipedia, the free encyclopedia, last printed Aug. 24, 2015, pp. 1-2, https://en.wikipedia.org/wiki/DWARF.

CN Application 201410444102.2, entitled "Identifying Semantic Difference Between Source Code Versions," filed on Sep. 2, 2014, 37 pages.

* cited by examiner

IDENTIFYING SEMANTIC DIFFERENCES BETWEEN SOURCE CODE VERSIONS

BACKGROUND

Various embodiments of the present disclosure relate to software development, and more specifically, to a method and system for identifying semantic differences between source code versions during software development.

With the increase of user demands, functions of computer software become increasingly complex. In the software development cycle, different source code versions in various development stages need to be tested frequently. Regression testing refers to retesting code after it has been modified so as to ensure that the modifications have not introduced new faults or caused other faults in the code. As an important part of software development, regression testing takes a large ratio of workload during the entire software development process. Generally speaking, developers gradually complete various functions in the software design and ensure the correctness of source code on the basis of regression testing.

For example, developers write a first source code version and find that through testing, the first source code version can achieve the expected design. Then, based on the first source code version, the developers continue to develop other functions and complete a second source version. During the subsequent development process of the second source code version, developers will add new code and modify existing code in the first source code version that has passed the regression test.

While testing the second source code version, it might be found that the second source code version has introduced new problems that do not exist in the first source code version. For example, the first source code version can pass the testing of some test cases, whereas the second source code version cannot pass the testing of these test cases. At this point, differences between the first source code version and the second source code version need to be compared to find and rule out faults that have been introduced during the second source code version development.

SUMMARY

In one embodiment of the present disclosure, there is provided a method for identifying a semantic difference between source code versions, comprising: obtaining first debugging information of a first source code version and second debugging information of a second source code version respectively; determining, by comparing the first debugging information with the second debugging information, whether in the second source code version there exists a second function matching a first function in the first source code version; and identifying the semantic difference on the basis of a result of the determining.

In one embodiment of the present disclosure, there is provided a system for identifying a semantic difference between source code versions, comprising: an obtaining module configured to obtain first debugging information of a first source code version and second debugging information of a second source code version respectively; a determining module configured to determine, by comparing the first debugging information with the second debugging information, whether in the second source code version there exists a second function matching a first function in the first source code version; and an identifying module configured to identify the semantic difference on the basis of a result of the determining.

With the method and system of the present disclosure, a semantic difference between various source code versions can be identified rapidly and accurately without changing the existing software development flow as far as possible.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 2 schematically shows a block diagram for identifying differences between source code versions according to one embodiment.

DETAILED DESCRIPTION

Some embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for a thorough and complete understanding of the present disclosure, and completely conveying the scope of the present disclosure to those skilled in the art.

Differences between a first source code version and a second source code version may be compared to find and rule out faults that have been introduced during the second source code development. However, the second source code development process may involve a complex process. For example, developers might add new code lines, delete existing code lines, modify existing code lines, etc. These modifications might introduce semantic differences between two source code versions (e.g., differences that likely cause a variation in operating results). In addition, developers might further adjust the order of code lines/functions in source code (e.g., swapping positions of two code lines/functions), replace variable names/function names, etc. From the perspective of text, these modifications may introduce text differences between two source code versions; however, regarding the compiling and execution of programming languages, these text differences may not exert any impact on an operating result. Thus, when looking for newly introduced faults, only semantic differences may be focused on, but text differences may be ignored. Therefore, one or more embodiments are directed toward developing a technical solution capable of identifying a semantic difference between different source code versions. Accordingly, text differences between different source code versions may be ignored and only semantic differences may be identified between the code versions so that developers can rapidly locate contents that are modified during development and that cause a program to generate a different operating result, and further find a code line that might cause faults.

Figure 1:
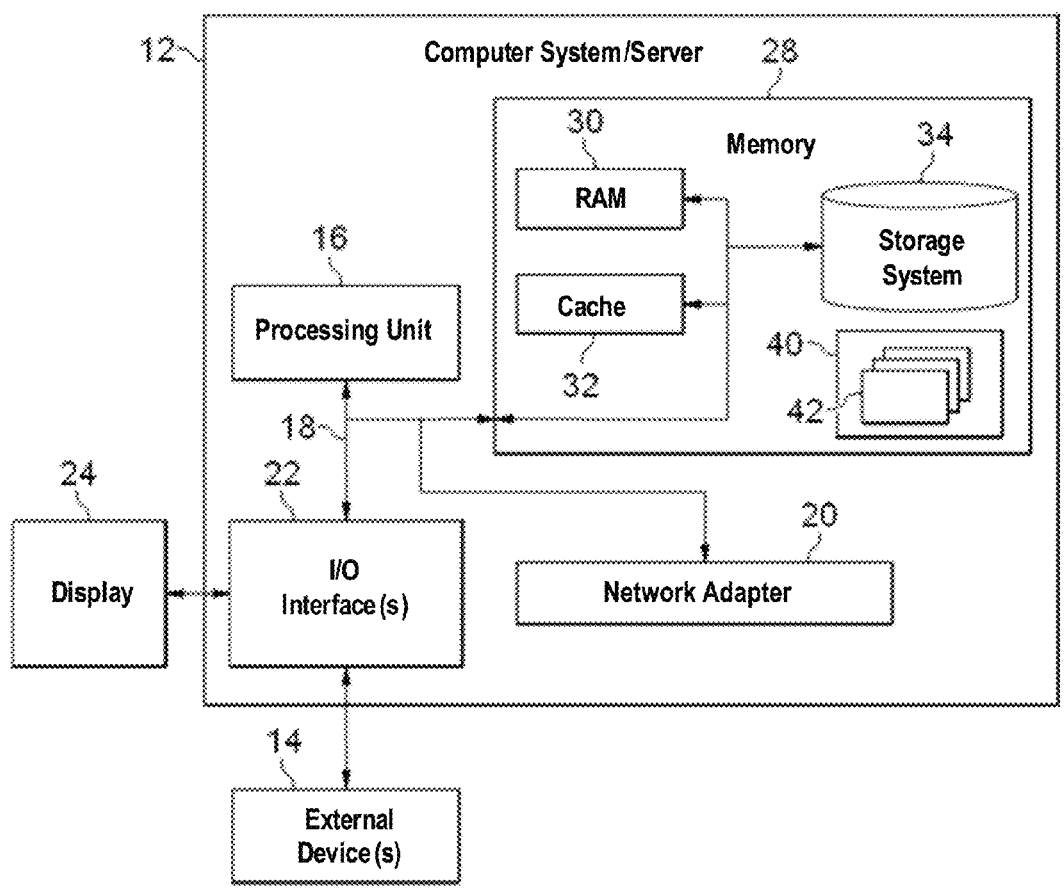
FIG. 1 schematically shows an example computer system/server 12, which is applicable to implement the embodiments of the present disclosure.

Referring now to FIG. 1, in which an exemplary computer system/server 12 which is applicable to implement the embodiments of the present disclosure is shown. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus that is associated with a memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc., one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
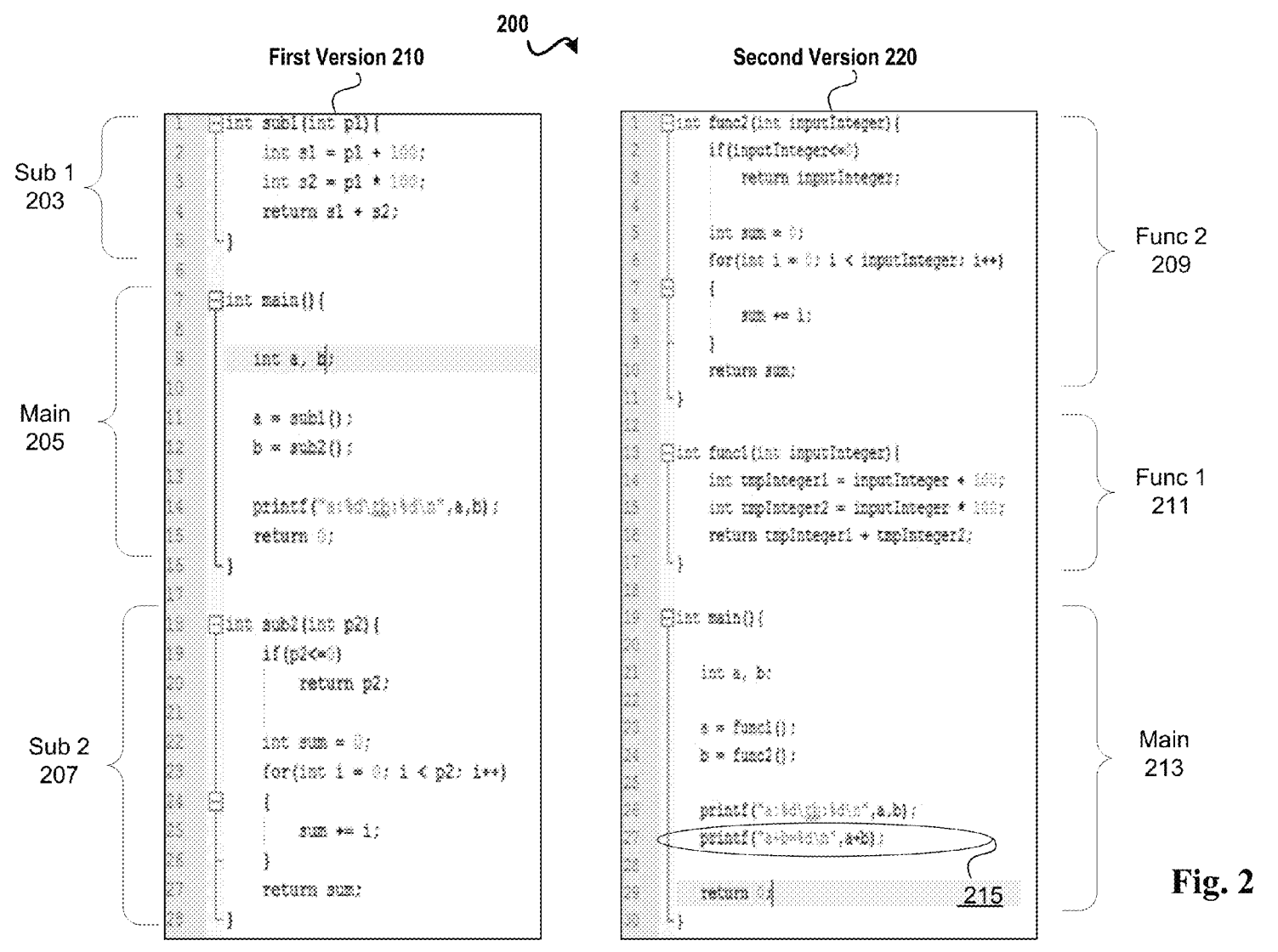

FIG. 2 schematically shows a block diagram 200 for identifying differences between source code versions according to one technical solution. As shown in FIG. 2, a first version 210 comprises a main function 205 and two functions sub1 203 and sub2 207, and a second version 220 comprises a main function 213 and two functions func1 211 and func2 209.

In an illustrative example, the second version 220 is the latest source code version developed on the basis of first version 210. Modifications to first version 210 comprise: 1) renaming the function sub1 203 as func1 211, and renaming variables p1, s1 and s2 in the function sub1 as inputInteger, tmpInteger1 and tmpInteger2 in func1 211 respectively; 2) renaming the function sub2 207 as func2 209, and renaming a variable p2 in the function sub2 207 as inputInteger in func2 209; and 3) adding to function main 213 a new code line "printf("a+b=% d\n",a+b)" 215. According to existing technical solutions, all the amendments as mentioned in 1) through 3) are differences between first version 210 and second version 220.

Those skilled in the art should understand although a plurality of functions and variables are renamed, renaming operations would not affect the operating result of source code, and they belong to only modifications in text content and will not change source code semantics. According to the technical solution for identifying differences on the basis of text content as shown in FIG. 2, differences 230 may comprise: 1) deleting the function sub1 203; 2) deleting the function sub2 207; 3) adding the function func1 211; 4) adding the function func2 209; and 5) adding the code line printf("a+b=% d\n",a+b) 215 to the main function 213.

In addition, differences between the first version and the second version may further include line number variation after a function's position is changed. Although this type of difference will not affect the source code semantics, they are still displayed in common text comparison tools, which greatly increases the workload of developers.

Because text differences will not affect the program operating result, developers do not care about text differences but only care about semantic differences in regression testing. Those skilled in the art would understand among differences as identified in FIG. 2, the only semantic difference is the adding of the code line printf("a+b=% d\n",a+b)

215, which may be the only difference that affects the program operating result, whereas the other differences are only text differences. A drawback in identifying text differences and semantic differences together is that semantic differences may only account for a small percentage (e.g., 20%) of identified differences. Therefore, developers have to search for semantic differences among a large amount of irrelevant text differences.

Note with the complication of user demands, the project of source code usually consists of hundreds or more files. FIG. 2 schematically illustrates a circumstance where the project comprises one file. Those skilled in the art should understand when source code involves a plurality of files, developers might make more types of text modifications, for example, add or delete files, move a function from one file to another, etc. Therefore, differences identified according to the technical solution as shown in FIG. 2 will contain more text differences, which makes it more difficult for developers to find out false code lines.

In view of the drawback in the above technical solution, the present disclosure provides a method for identifying a semantic difference between source code versions, comprising: obtaining first debugging information of a first source code version and second debugging information of a second source code version respectively; determining, by comparing the first debugging information with the second debugging information, whether in the second source code version there exists a second function matching a first function in the first source code version; and identifying the semantic differences on the basis of a result of the determining.

Those skilled in the art should note that throughout the context of the present disclosure, "first source code version" and "second source code version" do not represent chronological order; instead, the words "first" and "second" are intended to differentiate the two source code version that are involved in regression testing. For example, the first source code version may refer to an old source code version that has undergone a previous testing round in regression testing, while the second source code version may refer to a new source code version that is undergoing a current testing round in regression testing; or the second source code version may refer to an old source code version, while the first source code version may refer to a new source code version.

Figure 3:
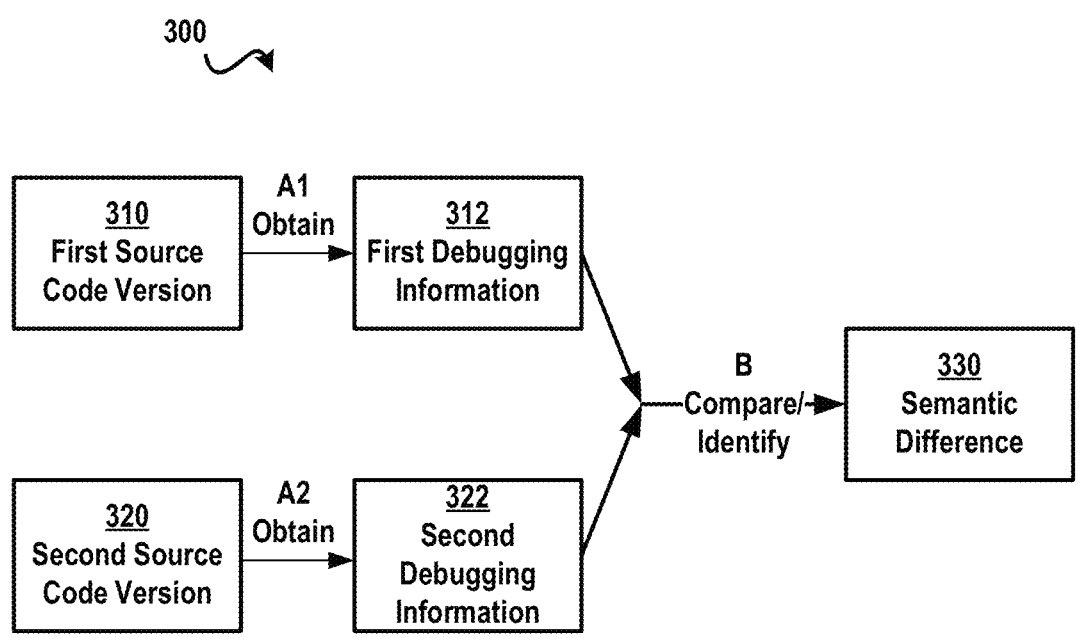
FIG. 3 schematically shows a block diagram of a technical solution for identifying a semantic difference between source code versions, according to one embodiment of the present disclosure.

FIG. 3 schematically shows a block diagram 300 of a technical solution for identifying differences between source code versions according to one embodiment of the present disclosure. As shown in FIG. 3, a first source code version 310 and a second source code version 320 are two source code versions that are involved in regression testing. In the embodiments of the present disclosure, semantic differences between various source code versions are identified by comparing debugging information of the various versions.

When compiling, a compiler collects a lot of information from source code, such as a variable name, a variable type, a line number where a function is located, a line number corresponding to a code sequence, a function name, a return type of a function, a formal parameter of a function, an address range of a function, and/or other information. Then, the compiler writes the information to a compiled file. In the context of the present disclosure, all of the information is collectively referred to as debugging information.

Debugging information has a variety of formats, such as stabs, COFF, PE-COFF and DWARF, etc. It is appreciated that, in various embodiments of the present disclosure, debugging information may be obtained from source code on the basis of various techniques that are known in the prior art or to be developed later. In the context of the present disclosure, debugging information is described by means of DWARF (Debugging With Attributed Record Formats). DWARF is widely used for debugging information. DWARF records a mapping relationship between memory addresses of executable programs and source code corresponding to these memory addresses.

By comparing two corresponding fragments in debugging information from the two source code versions, it can be determined whether source code fragments that have a mapping relationship with these corresponding fragments are consistent or not. Since text differences between the two source code versions will not cause any significant difference between debugging information, by comparing debugging information, semantic differences between the two source code versions can be found conveniently and rapidly, and meanwhile text differences are ignored.

According to embodiments of the present disclosure first debugging information 312 can be obtained from first source code version 310 (as shown by an arrow A1), and second debugging information 322 can be obtained from second source code version 320 (as shown by an arrow A2). Subsequently, through a comparison/identifying step as shown by an arrow B2, it can be rapidly determined whether there are matched functions between first source code version 310 and second source code version 320, and further semantic differences 330 can be identified. It is appreciated that, in various embodiments of the present disclosure, programmers may execute further processing to identified semantic differences 330 by means of various existing debugging tools.

Figure 4:
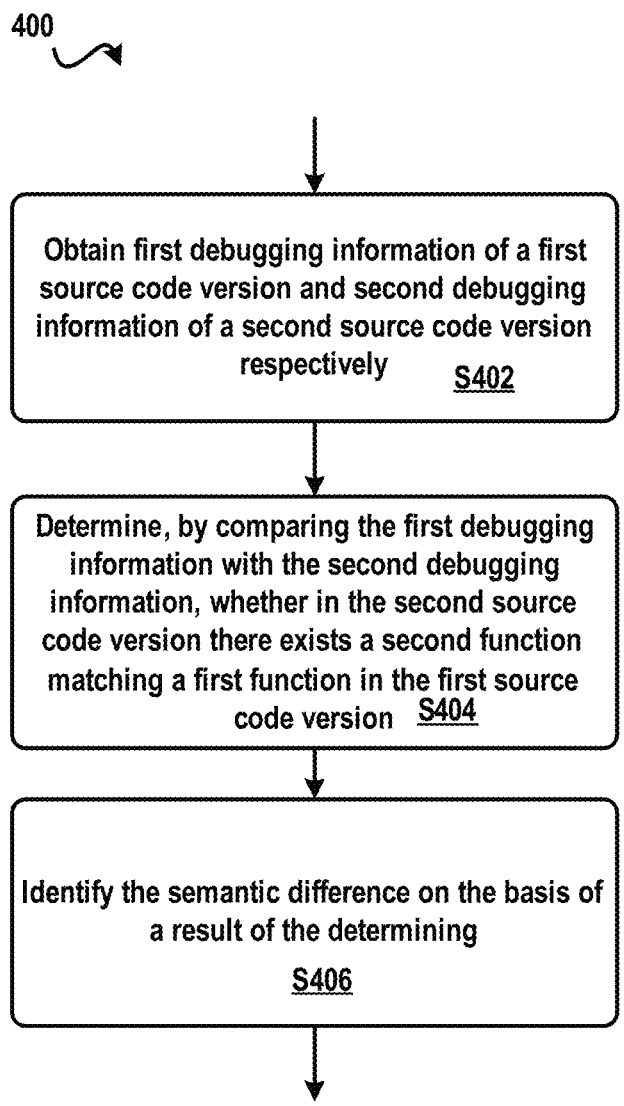
FIG. 4 schematically shows a flowchart of a method for identifying a semantic difference between source code versions according to one embodiment of the present disclosure.

Description is presented below to more details of the present disclosure with reference to the accompanying drawings. Specifically, FIG. 4 schematically shows a flowchart 400 of a method for identifying a semantic difference between source code versions according to one embodiment of the present disclosure. In block S402, first debugging information of a first source code version and second debugging information of a second source code version are obtained respectively. After the compiler compiles source code, a resultant file includes debugging information. Therefore, the first source code version and the second source code version can be compiled respectively, and the first debugging information and the second debugging information are obtained from corresponding resultant files respectively. Alternatively, since at this point the first source code version and the second source code version are two versions in the regression testing, the first debugging information and the second debugging information can be obtained directly from executable programs used for the regression testing.

Per block S404, by comparing the first debugging information and the second debugging information, it is determined whether in the second source code version there exists a second function matching a first function in the first source code version. Since changes in debugging information can accurately reflect semantic differences between source code versions, variation in two sets of debugging information is sought, and further semantic differences between the two source code versions are identified.

It is appreciated that, after variation occurs in debugging information, contents of a source code fragment corresponding to the changing part in the debugging information is changed, and such a change is not a text change but a semantic change that will affect a program operating result. Compared with a traditional method for text comparison based on two source code versions in the prior art, the present disclosure proposes a technical solution for identifying semantic differences between source code by comparing debugging information. With the technical solution of the present disclosure, semantic differences between different source code versions can be found rapidly and accurately.

In one embodiment of the present disclosure, function prototype parts of matched functions are the same as each other, and code lines in function bodies may differ. According to the technical solution of the present disclosure, first a correspondence relationship between the first source code version and the second source code version needs to be determined.

Per block S406, the semantic difference is identified on the basis of a result of the determining. Accordingly, if there is a first function in the first source code version and in the second source code version there is no second function matching the first function, then the first function is identified as the semantic difference. If there is a matched second function in the second version, then the flow continues to compare details of the first function and the second function so as to accurately identify the semantic difference.

In one embodiment of the present disclosure, the identifying the semantic difference on the basis of a result of the determining comprises identifying the first function as the semantic difference, in response to there not being the second function. For example when the first source code version is an old version while the second source code version is a new version, if there is a first function in the first source code version while there is no matched second function in the second source code version, it may be considered that the first function has been deleted from the new version (or the first function has been modified significantly). At this point, the first function belongs to the semantic difference, and further developers can look for faults in the first function.

In another example, when the second source code version is an old version while the first source code version is a new version, if there is a first function in the first source code version while there is no matched second function in the second source code version, it may be considered that the first function has been added to the new version (or a given function in the second source code version has been modified significantly). At this point, the first function belongs to the semantic difference, and further developers can look for faults in the first function.

When developing a new source code version on the basis of an old source code version, developers will not modify function names in the old source code version. Therefore, for sake of simplicity, first it may be searched for in the second source code version whether or not there is a function with the same function name as a first function. If there is a function with the same function name as a first function, it may further be determined whether the found function matches the first function. If there is not a function with the same function name as a first function, it may be searched for in the second source code version whether there is a second function matching the first function on the basis of other method (e.g., by comparing prototypes of functions).

In one embodiment of the present disclosure, the determining, by comparing the first debugging information with the second debugging information, whether in the second source code version there exists a second function matching a first function in the first source code version includes extracting a first prototype of the first function from the first debugging information and extracting a second prototype of a function from the second debugging information. And in response to the prototype of the function not matching the first prototype, determining the second function does not exist; otherwise, determining there exists the second function.

It is appreciated that, since developers might modify a return type function, formal parameter of a function and code line in a function body are not necessarily matched functions, even if names of two functions in the first source code version and the second source code version are exactly the same as each other. Therefore, in the context of the present disclosure, prototypes of two functions are further compared to determine whether the two functions are matched.

The function prototype may involve the following three elements: return type of the function, name of the function, and a formal parameter list. The formal parameter list comprises type of a formal parameter but does not have to comprise name of the formal parameter. The function prototype describes an interface of a function, so whether two functions are matched may be determined on the basis whether function prototypes are matched. Table 1 to Table 4 schematically show 4 functions below. Now with reference to Table 1 to Table 4, illustration is presented to how to determine whether function prototypes are matched.

TABLE 1

Function 1

```
int sub1 (int p1){
    int s1=p1+100;
    int s2=p1*100;
    return s1+s2;
}
```

TABLE 2

Function 2

```
int func1 (int p1){
    int s1=p1+100;
    int s2=p1*100;
    return s1+s2;
}
```

TABLE 3

Function 3

```
int s1 (int p1, int p2){
    ...
}
```

TABLE 4

Function 4

```
int func1 (int p1){
    int tmpInteger1=p1+100;
    int tmpInteger2=p1 *100;
    return tmpInteger1+ tmpInteger12;
}
```

Regarding a function sub1 as shown in Table 1 above, function sub1 prototype may be "int sub1(int)." It is appreciated that, since developers might modify the function name, a match of function prototypes as described in the context of the present disclosure may require matched return types and matched formal parameters, but may not necessarily require completely identical function names. Specifically, although the prototype of a function as shown in Table 2 is "int func1 (int p1)", i.e., names of a function 1 and a function 2 differ (sub1 and sub2 respectively), since return types of these two functions are both int type and both formal parameter lists of the two functions comprise one parameter of int type, prototypes of the function 1 and the function 2 are matched.

For another example, compare the function 1 shown in Table 1 and the function 3 shown in Table 3. Although their return types and function names are the same, since the formal parameter list of the function 1 comprises one parameter of int type whereas the formal parameter list of the function 3 comprises two parameters of int type, at this point prototypes of the function 1 and the function 3 are not matched. It is appreciated that, the formal parameter list in the function prototype only considers the amount and type of formal parameters but does not consider the name of formal parameters and concrete implementation within the function, so function prototypes of the function 1 shown in Table 1 and a function 4 shown in Table 4 are matched.

Those skilled in the art should understand the function prototype can identify the most important information of the function. When there exist a plurality of matched function prototypes, further information of two functions like variable information, line number information or instruction sequence may be compared to further determine whether there exists a semantic difference between the two functions. In this manner, a matched second function can be found more accurately, which will be described in more detail.

In one embodiment of the present disclosure, the determining the second function does not exist in response to the prototype of the function not matching the first prototype includes determining the second function does not exist, in response to a hash value of the prototype of the function not matching a first hash value of the first prototype.

With the increase of user demands, the complexity level of source code might get increasingly high, and the function prototype will also become more complex. To reduce the computation load in the comparison process and increase the comparison efficiency, a first hash value of the first prototype of the first function and a hash value of the prototype of the function may further be calculated respectively. Because the hash algorithm can ensure the first hash value and the hash value are mapped to respective unique values, by comparing the first hash value with the hash value, it can be determined whether the first prototype and the prototype are matched, and further it can be determined whether in the second source code version there exists a second function matching the first function.

When it is determined that there exists the second function in the second source code version, further a portion in the first debugging information associated with the first function needs to be compared with a portion in the second debugging information associated with the second function. This may help determine at finer granularity whether there exists a semantic difference between the first function and the second function. Specifically, comparison may be made between contents in at least one of: program counter information, line number information, variable information or instruction sequence.

In one embodiment of the present disclosure, the identifying the semantic difference on the basis of a result of the determining comprises: in response to determining there exists the second function, extracting first program counter scope of the first function from the first debugging information, and extracting second program counter scope of the second function from the second debugging information; in response to the first program counter scope not matching the second program counter scope, identifying the first function as the semantic difference.

The program counter scope describes address scope of an instruction sequence associated with a function (i.e., scope between start address and end address of an instruction sequence resulting from compiling the function). Generally speaking, making a semantic modification to the function will cause variation in the program counter scope. When finding variation in the program counter scope, there is reason to doubt that semantic variation occurs in the relevant function. Therefore, the semantic difference can be identified on the basis of variation in the program counter scope.

When it is found that program counter scopes of two functions are different, it can be determined there exists a semantic difference between the two functions. However, it is appreciated that, where program counter scopes of two functions are the same, there still might exist a semantic difference between the two functions. Therefore, the judgment as to whether program counter scopes are matched is not the sole criterion to judge whether there exists a semantic difference, but it may further be judged whether other respects of the two functions are matched.

In one embodiment of the present disclosure, the identifying the semantic difference on the basis of a result of determining further includes: extracting, in response to determining there exists the second function, an instruction sequence of a first line of the first function from the first debugging information, and extracting an instruction sequence of a second line of the second function from the second debugging information. In response to the instruction sequence of the first line not matching the instruction sequence of the second line, a code line may be identified that leads to a mismatch between the instruction sequence of the first line and the instruction sequence of the second line as the semantic difference. It is appreciated that, the words "first" and "second" here are intended to differentiate code lines in different functions and do not represent order of a code line in a function.

The debugging information records numbers of each code line and a corresponding instruction sequence of each code line in the function. Therefore, an instruction sequence of each code line in the first function is compared with an instruction sequence of each code line in the second function, so as to determine whether the two functions have a semantic difference between them (e.g., adding or deleting a code line). Specifically, Table 5 to Table 7 schematically show definition of functions below.

TABLE 5

| Function 5 | |
|---|---|
| Line Number | Code Line |
| 1 | int func1 (int p1){ |
| 2 | int s1=p1+100; |
| 3 | int s2=p1*100; |
| 4 | return s1+s2; |
| 5 | } |

TABLE 6

Function 6

| Line Number | Code Line |
|---|---|
| 1 | int func1 (int p1){ |
| 2 | int s1=p1+100; |
| 3 | int s2=p1*100; |
| 4 | |
| 5 | return s1+s2; |
| 6 | } |

TABLE 7

Function 7

| Line Number | Code Line |
|---|---|
| 1 | int func1 (int p1){ |
| 2 | int s1=p1+100; |
| 3 | int s2=p1*100; |
| 4 | s2=s2+1; |
| 5 | return s1+s2; |
| 6 | } |

It is appreciated that, a function 5 shown in Table 5 and a function 6 shown in Table 6 are matched functions, so line number information in the two functions further needs to be compared. It is found through the comparison that the line number of the function 5 is (2→3→4) whereas the line number of the function 6 is (2→3→5), at this point instruction sequences corresponding to various code lines may be compared: at the line number 2, an instruction sequence of the function 5 matches an instruction sequence of the function 6; at the line number 3, an instruction sequence of the function 5 matches an instruction sequence of the function 6; an instruction sequence at the line number 4 of the function 5 matches an instruction sequence at the line number 6 of the function 6. At this point, although the line numbers of the two functions are not exactly the same, instruction sequences are matched, so it is considered that there is no semantic difference between the function 5 and the function 6.

It is appreciated that, although illustrated above is a circumstance where an empty line is added to the function 6, developers might further combine a plurality of code lines in the old version to one line. Those skilled in the art may design specific implementation details based on the principle described in the present specification, which is not detailed here.

For another example, the function 5 shown in Table 5 has the same function prototype as a function 7 shown in Table 7, so the function 5 and the function 7 are matched functions. By comparing the function 5 with the function 7, it is found that the line number of the function 5 is (2→3→4) and the line number of the function 7 is (2→3→4→5). Instruction sequences associated with various line numbers may be compared: at the line number 2, an instruction sequence of the function 5 matches an instruction sequence of the function 7; at the line number 3, two instruction sequences also match each other; at the line number 4, two instruction sequences do not match each other; an instruction sequence of the function 5 at the line number 4 matches an instruction sequence of the function 7 at the line number 5. Therefore, it can be determined the $4^{th}$ line (i.e., "s2=s2+1;") is a semantic difference.

In one embodiment of the present disclosure, the identifying the semantic difference on the basis of a result of the determining further comprises: extracting, in response to determining there exists the second function, first variable information of the first function from the first debugging information, and extracting second variable information of the second function from the second debugging information. In response to the first variable information not matching the second variable information, it may be determined whether a first instruction associated with the first variable information in the first debugging information matches a second instruction associated with the second variable information in the second debugging information. In response to the first instruction not matching the second instruction, a variable may be identified that causes a mismatch between the first variable information and the second variable information as the semantic difference.

In order to increase the readability of source code, programmers might replace the name of a function or replace names of part of or all variables in the function. For example, in the function 1 shown in Table 1 and the function 4 shown in Table 4, the function name sub1 in the function 1 is replaced with func1 in the function 4, and the variables s1 and s2 in the function 1 are replaced with tmpInteger1 and tmpInteger2 in the function 4 respectively.

It is appreciated that, the replacement of the function name and variable names results in that the function 1 and the function 4 are totally different from the text perspective, but the two functions contain no semantic difference in the sense of function semantics. Therefore, interference from name replacement needs to be prevented when identifying a semantic difference.

Specifically, first variable information and second variable information needs to be extracted from the first debugging information and the second debugging information respectively; when detecting the first variable information does not match the second variable information (for example, it is detected that the first variable information comprises s1 and s2 while the second variable information comprises tmpInteger1 and tmpInteger2), a first instruction associated with s1 in the first debugging information may be determined, and a second instruction associated with tmpInteger1 in the second debugging information may be determined. If the first instruction matches the second instruction, it may be considered that the variable names s1 and tmpInteger1 are merely in a name replacement relationship; otherwise, variables (e.g., s1 in the function 1 and tmpInteger1 in the function 4) that cause a mismatch between the first variable information and the second variable information are identified as semantic differences. Similarly, those skilled in the art may further extract respective instructions associated with the variables s2 and tmpInteger2 from the first debugging information and the second debugging information and compare them.

In one embodiment of the present disclosure, the identifying the semantic difference on the basis of a result of the determining may further include obtaining, in response to determining there exists the second function, a first instruction sequence of the first function from the first debugging information, and obtaining a second instruction sequence of the second function from the second debugging information. In response to the first instruction sequence matching the second instruction sequence, it may be determined that there is no semantic difference between the first function and the second function.

In order to determine at finer granularity whether there is a semantic difference between two functions, a first instruction sequence resulting from compiling the first function may be extracted from the first debugging information, and a second instruction sequence resulting from compiling the second function may be extracted from the second debugging information. Since the first instruction sequence and the second instruction sequence record, in detail, semantic features of the first function and the second function respectively, by comparing the first instruction sequence with the second instruction sequence, it can be determined accurately whether there is a semantic difference between the two functions. When the two instruction sequences match each other, it can be determined that there is no semantic difference between the two functions.

Figure 5:
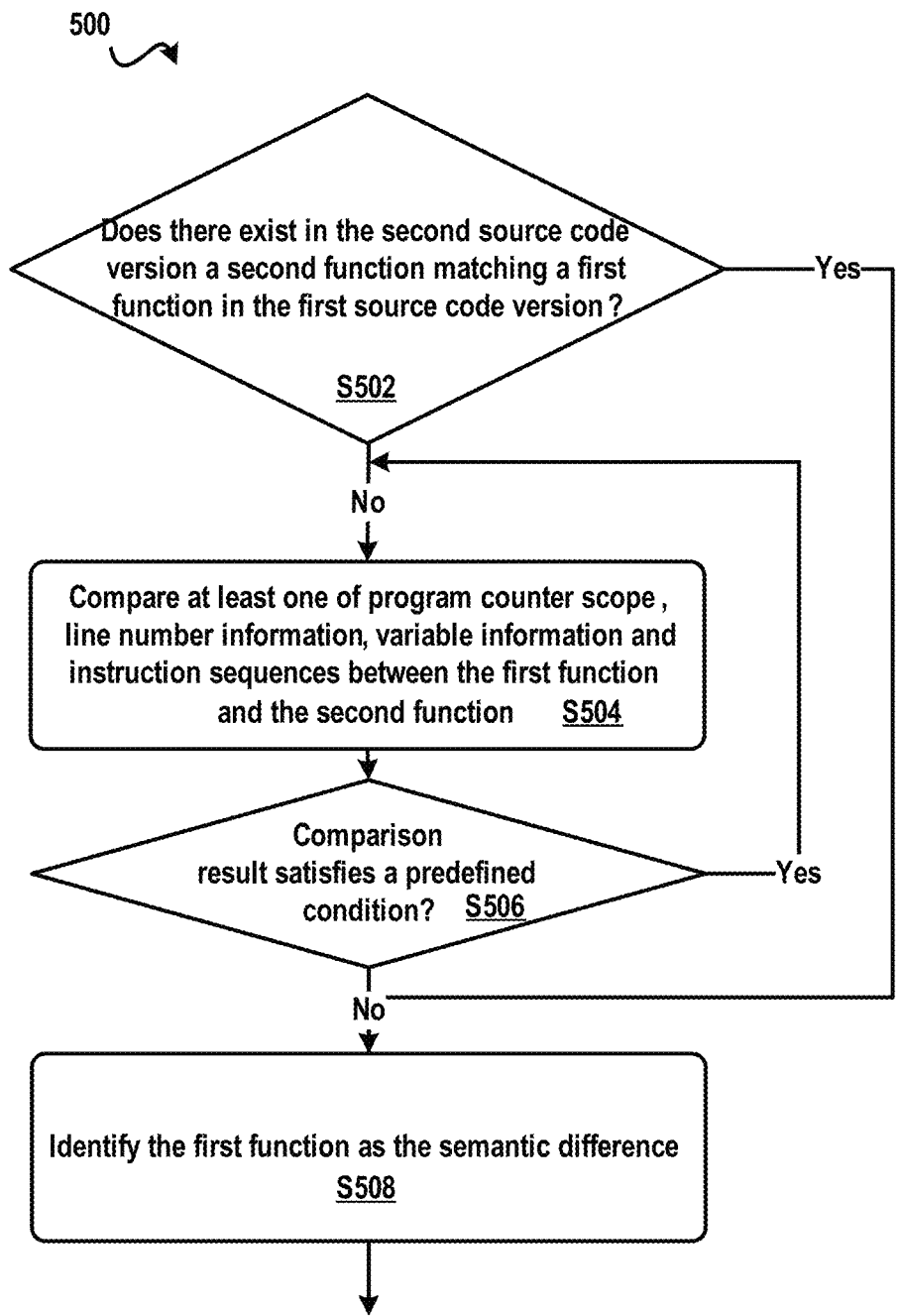
FIG. 5 schematically shows a flowchart of a method for identifying a semantic difference between source code versions by comparing debugging information according to one embodiment of the present disclosure.

As description has been presented above to steps of various embodiments of the present disclosure by means of concrete examples, now with reference to FIG. 5, illustration is presented to the operational flow of the method of the present disclosure so that those skilled in the art can understand the execution order between these steps more clearly. FIG. 5 schematically shows a flowchart 500 of a method for identifying a semantic difference between source code versions by comparing debugging information according to one embodiment of the present disclosure.

First of all, per block S502 it is determined whether in a second source code version there exists a second function matching a first function in a first source code version; if not, it is indicated the first function only appears in the first source code version, and further the operational flow proceeds to block S508 where the first function is identified as the semantic difference. If the determination result is "Yes", then the operational flow proceeds to block S504, at which point first debugging information needs to be compared with second debugging information in various respects and further it is determined whether there is a semantic difference between the first function and the second function. Specifically, the first function may be compared with the second function in at least one respect of: program counter scope, line number information, variable information and/or instruction sequence.

Per block S506, it may be determined whether the comparison result satisfies predefined conditions related to different respects (for example, when comparing program counter scopes of the two functions, it should be determined whether program counter scopes of the two functions are the same as each other). If the comparison result does not satisfy the predefined condition, the operational flow proceeds to block S508 so as to identify a corresponding fragment in the first function as the semantic difference. When the comparison result satisfies the predefined condition, the operational flow then returns to block S504 so as to make comparisons between other respects.

It is appreciated that, in the embodiments of the present disclosure, first it may be compared whether instruction sequences of the two functions match each other. If there is a match, then it is determined that there is no semantic difference between the two functions. If there is not match, then comparison is made in various respects one after another (such as program counter information, line number information, variable information) so as to identify the semantic difference in various respects.

It is appreciated that, those skilled in the art may select one or more of the above debug information to make comparison according to requirements of a concrete application environment. For example, when it is determined that program counter scopes of the two functions do not match each other, comparison may further be made in line number information of the two functions, so as to determine whether modification like adding or deleting a code line has been made. In another example, when it is determined that instruction sequences of the two functions are matched, it can be determined there is no semantic difference between the two functions.

Figure 6:
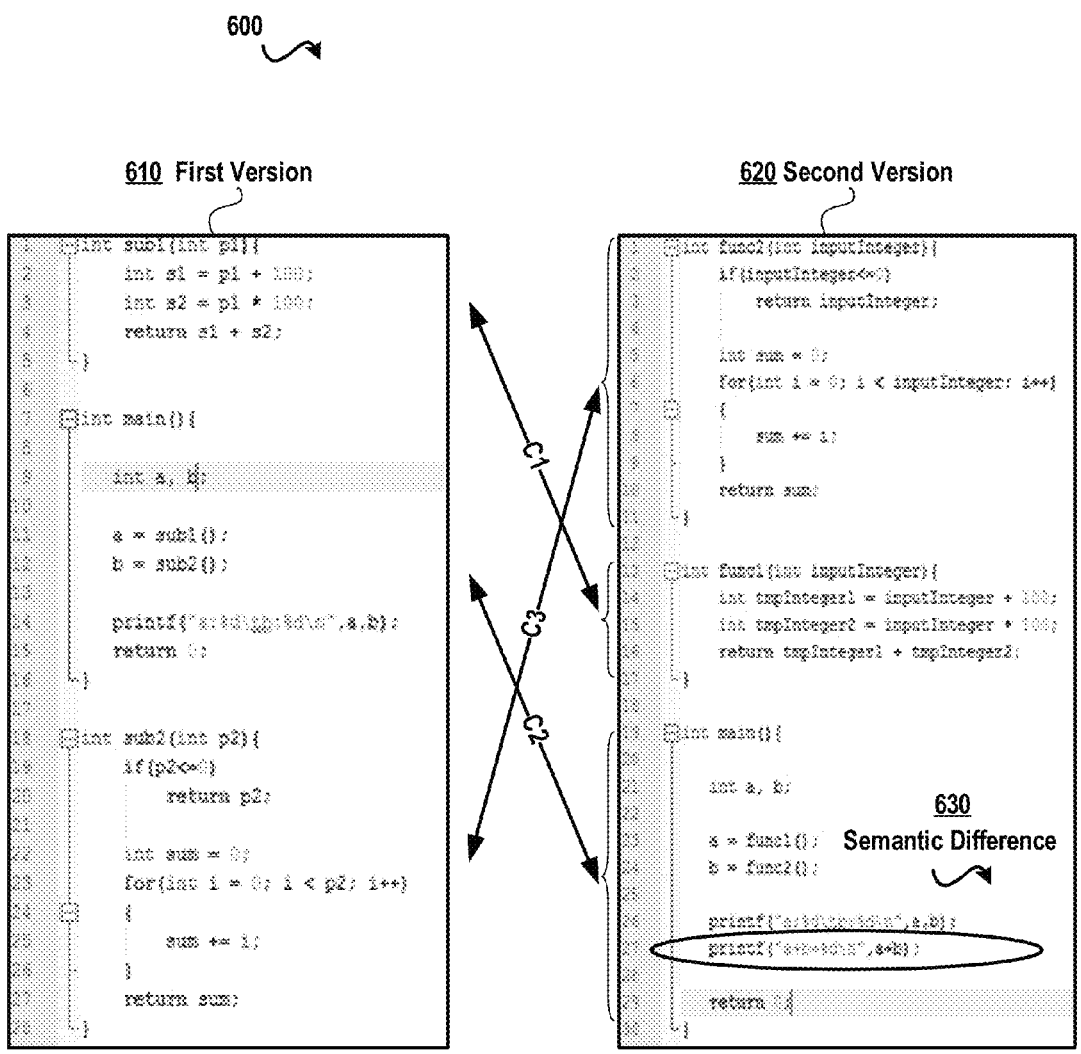
FIG. 6 schematically shows a block diagram for identifying a semantic difference between source code versions, according to one embodiment of the present disclosure.

FIG. 6 schematically shows a block diagram 600 of identifying a semantic difference between source code versions according to one embodiment of the present disclosure. In embodiments of the present disclosure, the following modifications may be found: a function sub1 in a first version 610 matches a function func1 in a second version 620 (as shown by an arrow C1), a function sub2 in first version 610 matches a function func2 in second version 620 (as shown by an arrow C3), a main function in first version 610 matches a main function in second version 620 (as shown by an arrow C2), and some variable names in first version 610 are replaced with variable names in second version 620 (for example, s1 is replaced with tmpInteger1, s2 is replaced with tmpInteger2, etc.).

Regarding various embodiments of the present disclosure, the above modifications only belong to text modifications and do not change semantics of source code. The semantic difference between first version 610 and second version 620 is only that a new code line "printf("a+b=% d\n",a+b)" is inserted into the 27th line in second version 620 (as shown by a semantic difference 630).

Those skilled in the art may understand, as compared with identifying a difference between two source code versions on the basis of text, the technical solution of the present disclosure can identify a semantic difference that might affect the programming result.

Specifically, by searching for matched functions between first version 610 and second version 620, a text difference caused by movement of the function position can be ignored. Accordingly, by comparing variable information of matched functions, a text difference caused by replacement of the variable name can be ignored. Alternatively, by comparing line number information of matched functions, it can be determined a new code line is inserted into the 27th line of second version 620. In this manner, the semantic difference between the two source code versions can be found rapidly and accurately, and further developers' workload of searching for a semantic difference among a large amount of irrelevant text differences can be reduced.

In one embodiment of the present disclosure, the obtaining first debugging information of a first source code version and second debugging information of a second source code version respectively comprises: obtaining the first debugging information from any one of a first executable file and a first object file resulting from compiling the first source code; and obtaining the second debugging information from any one of a second executable file and a second object file resulting from compiling the second source code. It is appreciated that, since debugging information is obtained by a compile operation, it can be obtained from an executable file or an object file resulting from compilation. Note that the first debugging information and the second debugging information specified in the present disclosure also comprise the instruction sequences from the first object file and the second object file respectively.

Various embodiments implementing the method of the present disclosure have been described above with reference to the accompanying drawings. Those skilled in the art may understand that the method may be implemented in software, hardware or a combination of software and hardware. Moreover, those skilled in the art may understand by implementing blocks in the above method in software, hardware or a combination of software and hardware, there may be provided a system based on the same disclosure concept. Even if the system has the same hardware structure as a general-purpose processing device, the functionality of software contained therein makes the system manifest distinguishing properties from the general-purpose processing device, thereby forming a system of the various embodiments of the present disclosure. The system described in the present disclosure comprises several means or modules, the means or modules configured to execute corresponding steps. Upon reading this specification, those skilled in the art may understand how to write a program for implementing actions performed by these means or modules. Because the system is based on the same disclosure concept as the method, the same or corresponding implementation details are also applicable to means or modules corresponding to the method. As detailed and complete description has been presented above, the system is not detailed below.

Figure 7:
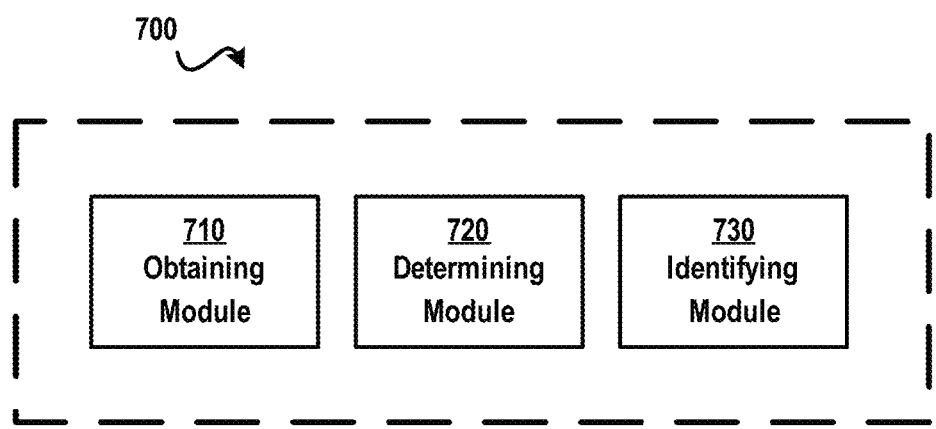
FIG. 7 schematically shows a block diagram of a system for identifying a semantic difference between source code versions, according to one embodiment of the present disclosure.

FIG. 7 schematically shows a block diagram 700 of a system for identifying a semantic difference between source code versions according to one embodiment of the present disclosure. The system may be a computing system having a processor and a memory, wherein the memory stores computer readable program instructions (e.g., obtaining module 710, determining module 720, and identifying module 730), the computer readable program instructions executable by the processor cause the system to perform the following functions, as described in more detail below. Specifically, there is shown an system for identifying a semantic difference between source code versions may include the following components: an obtaining module 710 configured to obtain first debugging information of a first source code version and second debugging information of a second source code version respectively; a determining module 720 configured to determine, by comparing the first debugging information with the second debugging information, whether in the second source code version there exists a second function matching a first function in the first source code version; and an identifying module 730 configured to identify the semantic difference on the basis of a result of the determining.

In one embodiment of the present disclosure, identifying module 730 comprises: a first identifying module configured to, in response to the second function not existing, identify the first function as the semantic difference.

In one embodiment of the present disclosure, determining module 720 comprises: a prototype extracting module configured to extract a first prototype of the first function from the first debugging information and extracting a second prototype of a function from the second debugging information; and a function determining module configured to, in response to the prototype of the function not matching the first prototype, determine the second function does not exist; otherwise, determine there exists the second function.

In one embodiment of the present disclosure, the function determining module includes a hash module configured to, in response to a hash value of the prototype of the function not matching a first hash value of the first prototype, determine the second function does not exist.

In one embodiment of the present disclosure, identifying module 730 includes a scope extracting module configured to, in response to determining there exists the second function, extract first program counter scope of the first function from the first debugging information, and extracting second program counter scope of the second function from the second debugging information. A second identifying module is configured to, in response to the first program counter scope not matching the second program counter scope, identify the first function as the semantic difference.

In one embodiment of the present disclosure, the identifying module further includes a line number information extracting module configured to extract an instruction sequence of a first line of the first function from the first debugging information, and extract an instruction sequence of a second line of the second function from the second debugging information. A third identifying module configured to, in response to the instruction sequence of the first line not matching the instruction sequence of the second line, identify a code line that causes a mismatch between the instruction sequence of the first line and the instruction sequence of the second line as the semantic difference.

In one embodiment of the present disclosure, the identifying module further include a variable information extracting module configured to, in response to determining there exists the second function, extract first variable information of the first function from the first debugging information, and extract second variable information of the second function from the second debugging information; an instruction comparing module configured to, in response to the first variable information not matching the second variable information, determine whether a first instruction associated with the first variable information in the first debugging information matches a second instruction associated with the second variable information in the second debugging information; and a fourth identifying module configured to, in response to the first instruction not matching the second instruction, identify a variable that causes a mismatch between the first variable information and the second variable information as the semantic difference.

In one embodiment of the present disclosure, the identifying module further included an instruction sequence extracting module configured to, in response to determining there exists the second function, obtain a first instruction sequence of the first function from the first debugging information, and obtain a second instruction sequence of the second function from the second debugging information. A fifth identifying module configured to, in response to the first instruction sequence matching the second instruction sequence, determine there is no semantic difference between the first function and the second function.

In one embodiment of the present disclosure, obtaining module 710 comprises: a first obtaining module configured to obtain the first debugging information from any one of a first executable file and a first object file resulting from compiling the first source code. A second obtaining module configured to obtain the second debugging information from any one of a second executable file and a second object file resulting from compiling the second source code.

With the method and system of the present disclosure, a semantic difference between various source code versions can be identified rapidly and accurately without changing the existing software development flow as far as possible.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, system (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing system to produce a machine, such that the instructions, which execute via the processor of the computer or other programmable data processing system, create means for implementing the functions/acts specified in the flowchart and/or block diagram block or blocks. These computer readable program instructions may also be stored in a computer readable storage medium that can direct a computer, a programmable data processing system, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing system, or other device to cause a series of operations to be performed on the computer, other programmable system or other device to produce a computer implemented process, such that the instructions which execute on the computer, other programmable system, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for identifying a semantic difference between source code versions, comprising:
   obtaining first debugging information of a first source code version and second debugging information of a second source code version respectively;

determining, by comparing the first debugging information with the second debugging information, that a second function of the second source code version does not match a first function of the first source code version, the determining includes:
  extracting a first prototype of the first function from the first debugging information and extracting a second prototype of the second function from the second debugging information,
  determining that the second prototype of the second function does not match the first prototype of the first function, wherein the first and second prototypes include: a return type of the first and second functions respectively, name of the first and second functions respectively, and a formal parameter list for each of the first and second functions respectively, wherein the formal parameter list only considers an amount and type of one or more formal parameters but does not consider a name of the one or more formal parameters, and
  determining that a second hash value of the second prototype of the second function does not match a first hash value of the first prototype, wherein a hash algorithm maps the first hash value to a first unique value, and the hash algorithm maps the second hash value to a second unique value, the first and second hash values for use in reducing a computation load for the comparing and for use in increase an efficiency of the comparing; and
identifying the semantic difference based on the determining, wherein the semantic difference is a difference that changes an operating result.

2. The method of claim 1, wherein the identifying the semantic difference based on the determining includes identifying that the first function includes the semantic difference.

3. The method of claim 1, wherein the identifying the semantic difference based on the determining includes:
  extracting a first program counter scope of the first function from the first debugging information, and extracting a second program counter scope of the second function from the second debugging information, wherein the program counter scope describes an address scope between a start address and end address of an instruction sequence resulting from compiling the first function;
  determining that the first program counter scope does not match the second program counter scope;
  in response to the determining that the first program counter scope does not match the second program counter scope, determining, by comparing line number information of the first function with line number information of the second function, that a first line of the first function has been added or deleted; and
  in response to the determining that first program counter scope does not match the second program counter scope and determining that the first line of the first function has been added or deleted, identifying the first function as the semantic difference.

4. The method of claim 1, wherein the identifying the semantic difference based on the determining includes:
  extracting a first instruction sequence of a first line of the first function from the first debugging information, and extracting a second instruction sequence of a second line of the second function from the second debugging information; and
  in response to the first instruction sequence of the first line not matching the second instruction sequence of the second line, identifying a code line of the first function that causes a mismatch between the first instruction sequence of the first line and the second instruction sequence of the second line, wherein the code line is the semantic difference.

5. The method of claim 1, wherein the identifying the semantic difference based on the determining includes:
  extracting a first variable information of the first function from the first debugging information, and extracting a second variable information of the second function from the second debugging information;
  determining that the first variable information does not match the second variable information, wherein the determining includes ignoring a name of any variable associated with the first variable information or the second variable information;
  in response to the determining that the first variable information does not match the second variable information, determining that a first instruction associated with the first variable information in the first debugging information does not match a second instruction associated with the second variable information in the second debugging information; and
  in response to the determining that the first instruction does not match the second instruction, identifying a variable that causes a mismatch between the first variable information and the second variable information, wherein the variable is the semantic difference.

6. The method of claim 1, wherein the identifying the semantic difference based on the determining includes:
  obtaining a first instruction sequence of a first line within the first function from the first debugging information, and obtaining a second instruction sequence of a second line within the second function from the second debugging information;
  determining that the first instruction sequence does not match the second instruction sequence; and
  in response to the determining that the first instruction sequence does not match the second instruction sequence, determining that the first function includes the semantic difference and determining that the second function includes a text difference, wherein the text difference does not change an operating result.

7. The method of claim 1, wherein the obtaining first debugging information of the first source code version and second debugging information of the second source code version respectively includes:
  obtaining the first debugging information from a first executable file and a first object file in response to compiling the first source code; and
  obtaining the second debugging information from a second executable file and a second object file in response to compiling the second source code.

8. A system for identifying a semantic difference between source code versions, the system comprising:
  a computing system having a processor and a memory, wherein the memory stores computer readable program instructions, the computer readable program instructions executable by the processor cause the system to:
  obtain, by an obtaining module, first debugging information of a first source code version and second debugging information of a second source code version respectively;
  determine, via a determining module, by comparing the first debugging information with the second debugging information, that a second function of the second source code version does not match a first function of the first source code version, the determine includes:
extract a first prototype of the first function from the first debugging information and extracting a second prototype of the second function from the second debugging information,
determine that the second prototype of the second function does not match the first prototype of the first function, wherein the first and second prototypes include: a return type of the first and second functions respectively, name of the first and second functions respectively, and a formal parameter list for each of the first and second functions respectively, wherein the formal parameter list only considers an amount and type of one or more formal parameters but does not consider a name of the one or more formal parameters, and
determine that a second hash value of the second prototype of the second function does not match a first hash value of the first prototype, wherein a hash algorithm maps the first hash value to a first unique value, and the hash algorithm maps the second hash value to a second unique value, the first and second hash values for use in reducing a computation load for the comparing and for use in increase an efficiency of the comparing; and
identify, by an identifying module, the semantic difference only based on the determining, wherein the semantic difference is a difference that changes an operating result.

9. The system of claim 8, wherein the computer readable program instructions executable by the processor that cause the system to identify, by the identifying module, the semantic difference based on the determining includes identifying, by the identifying module, that the first function includes the semantic difference.

10. The system of claim 8, wherein the computer readable program instructions executable by the processor that cause the system to identify, by the identifying module, the semantic difference based on the determining includes:
extracting, by the identifying module, a first program counter scope of the first function from the first debugging information, and extracting a second program counter scope of the second function from the second debugging information, wherein the program counter scope describes an address scope between a start address and end address of an instruction sequence resulting from compiling the first function;
determining, by the identifying module, that the first program counter scope does not match the second program counter scope; and
in response to the determining that first program counter scope does not match the second program counter scope, identifying, by the identifying module, the first function as the semantic difference.

11. The system of claim 8, wherein the computer readable program instructions executable by the processor that cause the system to identify, by the identifying module, the semantic difference based on the determining includes:
extracting, by the identifying module, a first instruction sequence of a first line of the first function from the first debugging information, and extracting a second instruction sequence of a second line of the second function from the second debugging information; and
in response to the first instruction sequence of the first line not matching the second instruction sequence of the second line, identifying, by the identifying module, a code line of the first function that causes a mismatch between the first instruction sequence of the first line and the second instruction sequence of the second line, wherein the code line is the semantic difference.

12. The system of claim 8, wherein the computer readable program instructions executable by the processor that cause the system to identify, by the identifying module, the semantic difference based on the determining includes:
extracting, by the identifying module, a first variable information of the first function from the first debugging information, and extracting a second variable information of the second function from the second debugging information;
determining, by the identifying module, that the first variable information does not match the second variable information;
in response to the determining that the first variable information does not match the second variable information, determining, by the identifying module, that a first instruction associated with the first variable information in the first debugging information does not match a second instruction associated with the second variable information in the second debugging information; and
in response to the determining that the first instruction does not match the second instruction, identifying, by the identifying module, a variable that causes a mismatch between the first variable information and the second variable information, wherein the variable is the semantic difference.

13. The system of claim 8, wherein the computer readable program instructions executable by the processor that cause the system to identify, by the identifying module, the semantic difference based on the determining includes:
obtaining, by the identifying module, a first instruction sequence of the first function from the first debugging information, and obtaining a second instruction sequence of the second function from the second debugging information;
determining, by the identifying module, that the first instruction sequence does not match the second instruction sequence; and
in response to the determining that the first instruction sequence does not match the second instruction sequence, determining, by the identifying module, that the first function includes the semantic difference.

14. The system of claim 8, wherein the computer readable program instructions executable by the processor that cause the system to obtain, by an obtaining module, first debugging information of the first source code version and second debugging information of the second source code version respectively includes:
obtaining, by the obtaining module, the first debugging information from a first executable file and a first object file in response to compiling the first source code; and
obtaining, by the obtaining module, the second debugging information from a second executable file and a second object file in response to compiling the second source code.

15. A computer program product for identifying one or more semantic differences between source code versions, the computer program product comprising a computer readable storage medium having program code embodied therewith, the program code comprising computer readable program code configured for:

obtaining first debugging information of a first source code version and second debugging information of a second source code version respectively;

determining, by comparing the first debugging information with the second debugging information, that a second set of functions of the second source code version does not match a first set of functions of the first source code version, the second set of functions and the first set of functions being included in a plurality of functions, the determining includes:

extracting a first prototype of the first set of functions from the first debugging information and extracting a second prototype of the second set of functions from the second debugging information, determining that the second prototype of the second set of functions does not match the first prototype of the first set of functions, wherein the first and second prototypes include: a return type of the first and second set of functions respectively, name of the first and second set of functions respectively, and a formal parameter list for each of the first and second set of functions respectively, wherein the formal parameter list only considers an amount and type of one or more formal parameters but does not consider a name of the one or more formal parameters, and determining that a second hash value of the second prototype of the second set of functions does not match a first hash value of the first prototype, wherein a hash algorithm maps the first hash value to a first unique value, and the hash algorithm maps the second hash value to a second unique value, the first and second hash values for use in reducing a computation load for the comparing and for use in increase an efficiency of the comparing; and identifying the one or more semantic differences based on the determining, wherein the one or more semantic differences is a difference that changes an operating result.

16. The computer program product of claim 15, wherein the program code comprising computer readable program code configured for identifying the one or more semantic differences based on the determining includes:

extracting a first instruction sequence of a first set of lines of the first set of functions from the first debugging information, and extracting a second instruction sequence of a second set of lines of the second set of functions from the second debugging information; and in response to the first instruction sequence of the first set of lines not matching the second instruction sequence of the second set of lines, identifying one or more code lines of the first set of functions that causes a mismatch between the first instruction sequence of the first set of lines and the second instruction sequence of the second set of lines, wherein the one or more code lines is the one or more semantic differences.

* * * * *